Dec. 1, 1925.
O. W. JOHNSON
COMB
Filed July 2, 1924
1,563,711
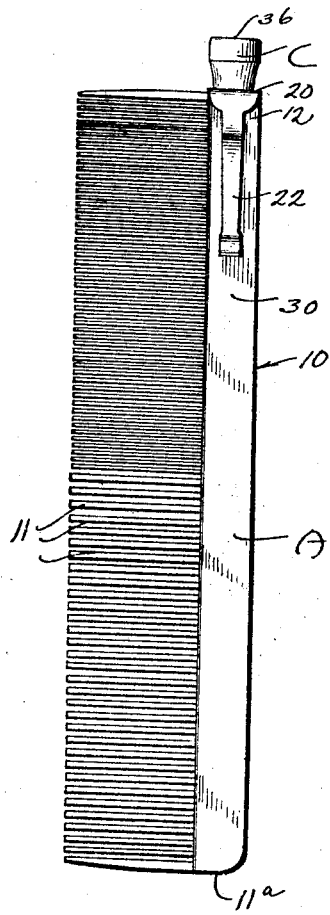
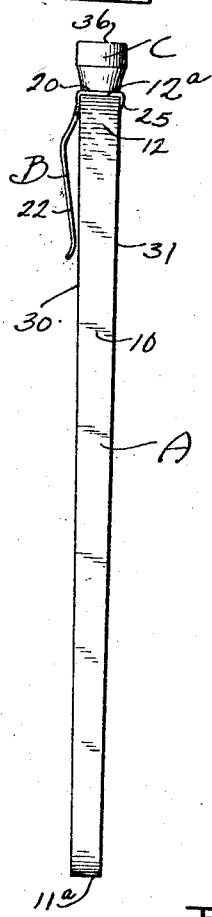
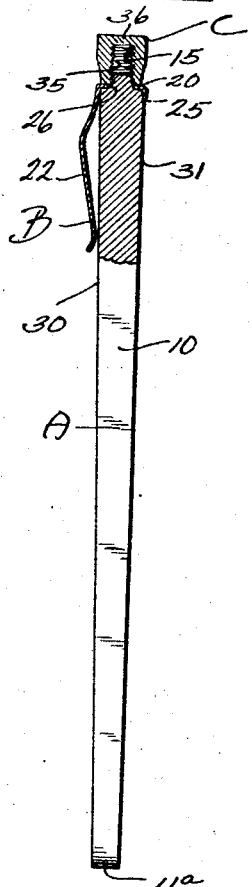
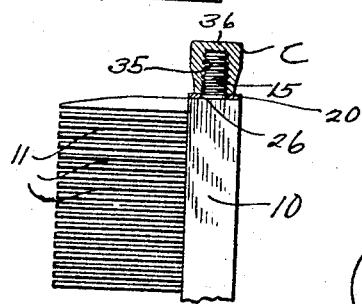
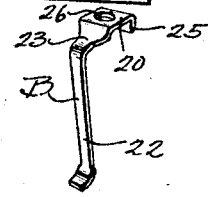
Inventor
Otto W. Johnson Patented Dec. 1, 1925.

1,563,711

UNITED STATES PATENT OFFICE.

OTTO W. JOHNSON, OF HOT SPRINGS, MONTANA, ASSIGNOR OF ONE-THIRD TO JOHN H. BRAS AND ONE-THIRD TO LEO A. HENTER, BOTH OF HOT SPRINGS, MONTANA.

COMB.

Application filed July 2, 1924. Serial No. 723,808.

*To all whom it may concern:*

Be it known that I, OTTO W. JOHNSON, a citizen of the United States, residing at Hot Springs, in the county of Sanders and State of Montana, have invented certain new and useful Improvements in a Comb, of which the following is a specification.

This invention relates to improvements in combs.

The primary object of this invention is the provision of an improved means for securing or retaining a clip upon a comb or like article.

A further object of this invention is the provision of an improved comb structure including novel means for securing a retaining clip thereto.

Other objects and advantages of this invention will be apparent during the course of the following detailed description.

In the accompanying drawing, forming a part of this specification, and wherein similar reference characters designate corresponding parts throughout the several views.

Figure 1 is a side elevation of the improved comb, showing the improved attaching clip and means for securing the same upon the comb.

Figure 2 is an edge elevation of the back of the comb, showing the novel construction of the same and the novel related features of the attaching clip.

Figure 3 is a view similar to Figure 2, with the details of the attaching clip and adjacent structure of the comb in section.

Figure 4 is a cross sectional view showing certain details of the improved attaching clip in cross section, with a fragmentary portion of the comb.

Fig. 5 is a perspective view of an attaching clip of a novel shape for use in connection with the comb.

In the drawing, wherein for the purpose of illustration is shown only a preferred embodiment of this invention the letter A may generally designate the comb, upon certain hereinafter described portions of which a clip B may be secured, as by means C.

Referring to the comb A, the same includes a back 10, from which the teeth 11 extend outwardly to one side. The back 10 is preferably of novel formation, tapering with an increased thickness from the end 11ª to the opposite end 12, upon which latter end the clip B is mounted. Extending outwardly of the end surface 12ª of the back 10 is a screw threaded shank 15, preferably of the same material as the back 10 of the comb, and integral therewith; the diameter of this shank 15 being considerably less than the thickness of the back 10 upon which it is positioned, to provide sufficient bearing surface for the clip B. To secure such construction the end of the comb upon which the screw threaded shank 15 is provided is of necessity relatively thicker than the back of the comb would ordinarily be constructed, and to this end the back 10 preferably tapers with an increasing thickness from the end surface 11ª toward the greater thickness at the opposite end surface 12ª.

The clip B is of novel formation, including a top wall 20, which in the preferred instance is flat, and outwardly of one side of which the resilient retaining arm 22 is provided, connected to said wall 20 as by an arcuate portion 23. At the opposite side of the wall 20 from the clip arm 22, a retaining flange 25 is provided, preferably disposed at right angles with respect to the plane of the wall 20. The wall 20 is provided with an aperture 26 therethrough.

Referring to the manner of placing the clip B upon the comb, the wall 20 engages over the end surface 12 of the comb back 10, with the retaining arm 22 overlying a side surface 30 of the back 10 of the comb, and so that the retaining flange 25 of the comb clip B engages the opposite side surface 31 of the comb back 10, adjacent the top or end surface 12ª thereof. The screw threaded shank 15, of course, is slipped thru the aperture 26, and the means C consists of a retaining nut, which is provided with an interiorly screw threaded socket 35 inwardly from one end thereof, closed as by a top wall 36 at the upper end of said nut. The nut or retaining member C is screw threaded over the post 15 until the lower edge thereof clamps against the top wall 20 of the clip B and secures said clip in the relation above described upon the comb back 10, so that the comb when slipped into a pocket will have a flap of the pocket secured between the resilient retaining arm 22 and the back 10 of the comb.

From the foregoing description it is apparent that a novel type of attaching clip has been provided, connected in a novel manner upon articles, and especially novel in connection with a comb of the nature described.

Various changes in the shape, size, and arrangement of parts may be made to the form of the invention herein shown and described, without departing from the spirit of the same or the scope of the claims.

I claim:

1. As an article of manufacture a clip comprising an attaching portion including a wall with an opening therethrough, a retaining arm to one side of the wall, and a retaining flange at the opposite side of said wall.

2. A comb including a back having teeth extending laterally thereof and a screw threaded shank extending outwardly of an end surface thereof, a clip including an attaching wall with an opening therethrough adapted to receive the screw threaded shank therethrough, said clip including a retaining arm at one side of the back of said comb and a retaining flange extending in engaging relation at the opposite side of said comb from said arm, and nut means for said screw threaded shank for clamping the attaching wall upon the end of said back of the comb.

3. In a comb structure the combination of a comb including a back, and a clip providing a retaining arm, an attaching portion substantially at right angles to the retaining arm, and a retaining flange substantially at right angles from the opposite edge of the attaching portion with respect to said retaining arm, and means securing the clip to the back of the comb so that the attaching portion lies snug against an end edge of the back with the retaining arm at one side of the back and the flange in engagement at the opposite side of said back.

4. A comb comprising a back portion having teeth extending laterally from a side edge thereof, said back being of a thickness which increases uniformly from one end of the said back to the opposite end thereof, said back outwardly of the end edge where said back is of greatest thickness having a reduced shank extending outwardly therefrom in alignment with said back, a clip including a retaining arm and an attaching portion, the latter having an opening therethrough for receiving said reduced shank therein whereby the retaining arm extends along a side surface of said back, and means connected with said reduced shank for clamping the attaching portion of the clip against the end edge of the back of said comb whereby to support the clip in the relation defined on said back.

OTTO W. JOHNSON.